S. W. SCHUSTER.
BAKING OVEN.
APPLICATION FILED NOV. 22, 1911.
1,023,483.
Patented Apr. 16, 1912.
2 SHEETS—SHEET 1.
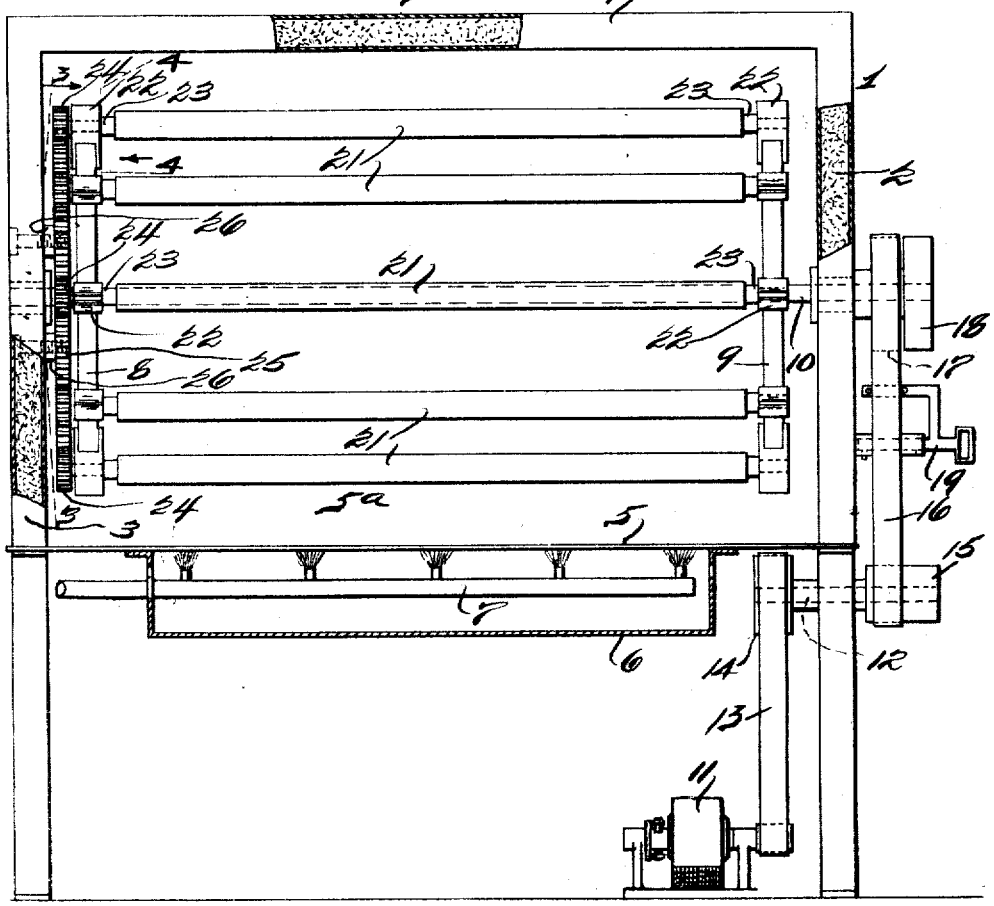
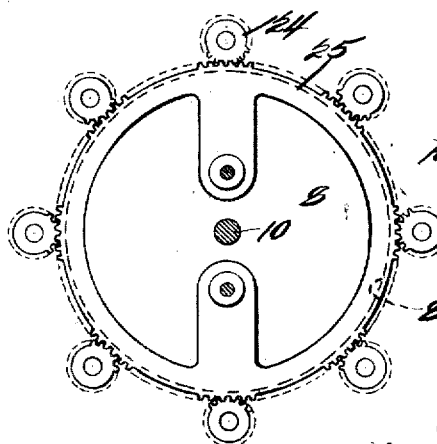
Witnesses:
Inventor
Stephan W. Schuster
by Maurice Block
attorney S. W. SCHUSTER.
BAKING OVEN.
APPLICATION FILED NOV. 22, 1911.
1,023,483.
Patented Apr. 16, 1912.
2 SHEETS—SHEET 2.
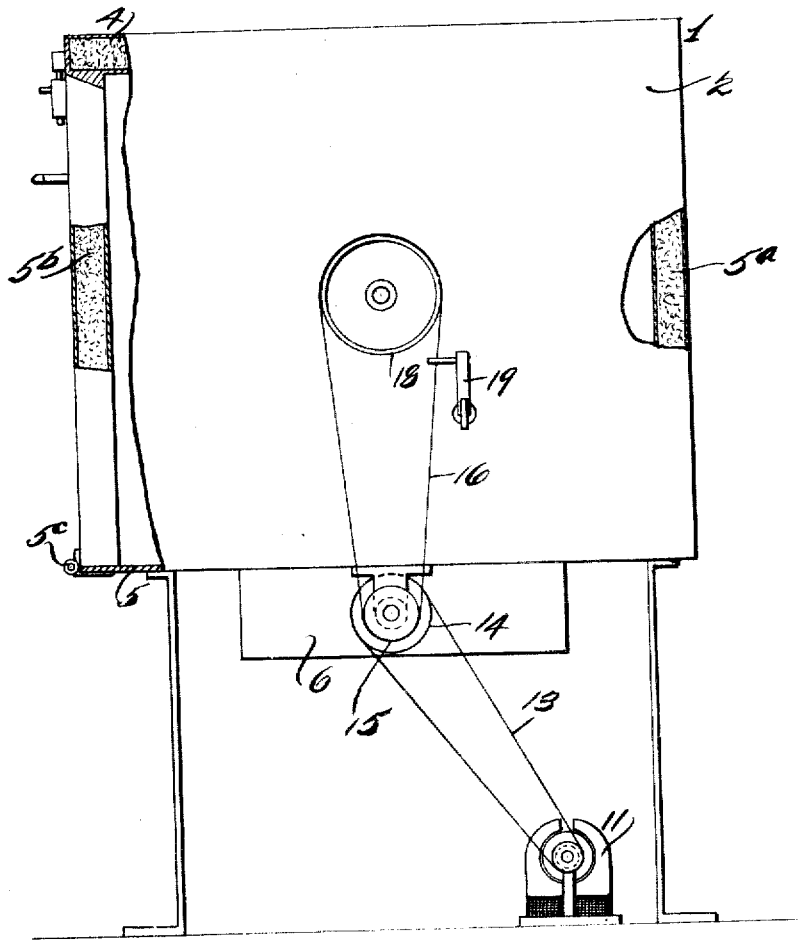
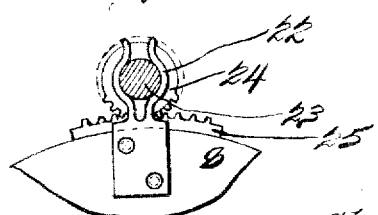

UNITED STATES PATENT OFFICE.

STEPHAN W. SCHUSTER, OF NEW YORK, N. Y.

BAKING-OVEN.

1,023,483.  Specification of Letters Patent.  Patented Apr. 16, 1912.

Application filed November 22, 1911. Serial No. 661,648.

*To all whom it may concern:*

Be it known that I, STEPHAN W. SCHUSTER, a subject of the King of Hungary, residing at Manhattan borough, city, county, and State of New York, have invented certain new and useful Improvements in Baking-Ovens, of which the following is a full, clear, and exact description.

This invention relates to an improvement in ovens, but more particularly to an oven which is adapted to bake hollow, cylindrical pastry, such as coffee cake, for instance.

One of the chief features of my improvement is a rotatable carrier or reel upon which the pastry is placed, the said reel being slowly rotated during the baking process.

Other features of improvement will be hereinafter set forth.

I will now proceed to describe my invention, the novel features of which I will finally point out in the claim, reference being had to the accompanying drawings, forming part hereof, wherein:

Figure 1 is a front elevation of my improved oven, partly in section, the door being removed; Fig. 2 is a side elevation of my improved oven, partly in section; Fig. 3 is a diagrammatic, detail, sectional view, the section being taken on a line 3—3 in Fig. 1; and Fig. 4 is an enlarged fragmentary, detail, sectional view, the section being taken on a line 4—4 in Fig. 1.

In the accompanying drawings, the numeral 1 indicates, as an entirety, my improved oven, the oven proper of which comprises the insulated side walls 2 and 3, insulated top 4, insulated back 5ª, and insulated door 5ᵇ, which is pivotally secured, as at 5ᶜ, to the plate bottom 5 of the oven proper. In this instance, I have shown, as secured to the bottom 5, a combustion chamber 6, which contains a heating element 7, in this instance, a plurality of gas-jets, indicated by 7.

By referring to Fig. 1, it will be seen that within the body of the oven I rotatably mount, in this instance, two heads or disks 8 and 9, the heads or disks being preferably circular. The heads 8 and 9 are carried by a shaft 10, rotatably mounted in the walls 2 and 3 of the oven. The shaft 10 is rotated by means of a motor 11, which drives the counter-shaft 12, by means of a belt 13, and a pulley 14 on the shaft 12. The shaft 12 carries a driven pulley 15, which, by means of a belt 16, drives the tight pulley 17 on the shaft 10.

The numeral 18 indicates a loose-pulley and 19 a belt-shifting device.

In order to support the pastry during the baking process, I provide rotatable spindles 21, which are supported in brackets 22 carried by the heads 8 and 9, the spindles 21 being provided with trunnions 23 adapted to be snapped into the bracket 22, which comprise resilient jaws, as can be seen in Fig. 4. The trunnions 23, at one end of each spindle 21, carries a pinion 24, each pinion being meshed with a circular stationary rack 25, secured to the wall 3 of the oven, as at 26.

When the reel which comprises the heads 8 and 9 and spindles 21 is rotated, the spindles 21 will revolve upon their axes, due to the intermeshing of the pinions 24 and rack 25. By this means the pastry, which is placed upon the reels 21, gets a double circular movement, one of such movements being due to the rotation of the reel which causes the spindles to successively pass over the heated bottom 5, the other of said circular movements being due to the rotation of the spindles 21 around their axes. The axial rotation of the spindles 21 prevent the pastry from burning as it passes over the heated bottom of the oven.

It is quite obvious from the drawings, especially from an inspection of Fig. 4, that the reels 21 are removably mounted in the brackets 22. The purpose of removably mounting the spindles 21, is to permit of the placing of the pastry upon the reels, as the said pastry is shaped previous to the placing thereof in the oven.

When the contents of the oven is cooked each spindle 21 will be removed, one by one, from the brackets 22 and the pastry removed therefrom. To prepare the reel for baking, the pastry will be placed upon the spindles and the said spindles snapped back into position on the brackets 22.

It will be, of course, understood that any heating element may be employed and I do not limit myself to the use of gas.

Having now described my invention, what

I claim and desire to secure by Letters Patent is:

An improved baking oven, comprising a box-like structure, having insulated walls, a shaft within said structure, means for rotating said shaft, heads carried by said shaft and located within said structure, brackets carried by said heads, spindles removably mounted in said brackets, and means adapted to rotate said spindles about their axes.

Signed at New York city, N. Y. this 20th day of November, 1911.

STEPHAN W. SCHUSTER.

Witnesses:
ESTELLE O. HAMBURGER,
EDWARD A. JARVIS.